US011416267B2

(12) United States Patent
Cao et al.

(10) Patent No.: US 11,416,267 B2
(45) Date of Patent: Aug. 16, 2022

(54) DYNAMIC HARDWARE ACCELERATOR SELECTION AND LOADING BASED ON ACCELERATION REQUIREMENTS

(71) Applicant: Huawei Technologies Co., Ltd., Shenzhen (CN)

(72) Inventors: Qian Cao, Nanjing (CN); Yuping Zhao, Nanjing (CN); Xinyu Hu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 16/407,920

(22) Filed: May 9, 2019

(65) Prior Publication Data

US 2019/0265985 A1  Aug. 29, 2019

Related U.S. Application Data

(63) Continuation of application No. PCT/CN2017/105878, filed on Oct. 12, 2017.

(30) Foreign Application Priority Data

Nov. 9, 2016  (CN) .......................... 201610989130.1

(51) Int. Cl.
  *G06F 9/455*  (2018.01)
  *G06F 9/46*   (2006.01)
  (Continued)

(52) U.S. Cl.
  CPC ............ *G06F 9/44521* (2013.01); *G06F 8/65* (2013.01); *G06F 9/445* (2013.01); *G06F 9/455* (2013.01);
  (Continued)

(58) Field of Classification Search
  CPC ...... G06F 9/44521; G06F 9/445; G06F 9/455; G06F 9/45558; G06F 16/245; G06F 8/65; G06F 2009/45562
  (Continued)

(56) References Cited

U.S. PATENT DOCUMENTS 6,510,469 B1   1/2003  Starnes et al.
8,914,626 B1 * 12/2014  Adogla .................. G06F 9/441
                                          713/2

(Continued)

FOREIGN PATENT DOCUMENTS

CN    102906738 A    1/2013
CN    103092678 A    5/2013
(Continued)

OTHER PUBLICATIONS

Google Cloud Platform, "Creating and Starting an Instance", Sep. 24, 2016 (Year: 2016).*

(Continued)

*Primary Examiner* — Bradley A Teets
(74) *Attorney, Agent, or Firm* — Conley Rose, P.C.

(57) ABSTRACT

An accelerator loading apparatus obtains an acceleration requirement, where the acceleration requirement includes an acceleration function of a to-be-created virtual machine and acceleration performance of the to-be-created virtual machine. The accelerator loading apparatus determines a target accelerator that meets the acceleration function of the to-be-created virtual machine and the acceleration performance of the to-be-created virtual machine. The accelerator loading apparatus determines an image corresponding to the target accelerator, and sends an image loading command to a target host in which the target accelerator is located, where (Continued)

the image loading command is used to enable the target host to load the image for the target accelerator based on the image loading command.

26 Claims, 9 Drawing Sheets

(51) Int. Cl.
    *G06F 9/445* (2018.01)
    *G06F 16/245* (2019.01)
    *G06F 8/65* (2018.01)

(52) U.S. Cl.
    CPC ........ *G06F 9/45558* (2013.01); *G06F 16/245* (2019.01); *G06F 2009/45562* (2013.01)

(58) Field of Classification Search
    USPC .......................................................... 718/1
    See application file for complete search history.

(56) References Cited

U.S. PATENT DOCUMENTS

| | | | |
|---|---|---|---|
| 9,378,043 B1* | 6/2016 | Zhang | G06F 9/45533 |
| 9,424,136 B1 | 8/2016 | Teater et al. | |
| 9,483,291 B1 | 11/2016 | Chen et al. | |
| 9,824,018 B2 | 11/2017 | Joshi et al. | |
| 9,891,935 B2* | 2/2018 | Teh | G06F 9/445 |
| 10,698,717 B2* | 6/2020 | Tang | G06F 9/455 |
| 2015/0089495 A1* | 3/2015 | Persson | G06F 9/45558 |
| | | | 718/1 |
| 2015/0261550 A1* | 9/2015 | Kruglick | G06F 9/45533 |
| | | | 705/26.41 |
| 2015/0319086 A1 | 11/2015 | Tripathi et al. | |
| 2015/0358248 A1 | 12/2015 | Saha et al. | |
| 2016/0132329 A1 | 5/2016 | Gupte et al. | |
| 2016/0210167 A1 | 7/2016 | Bolic et al. | |
| 2016/0239424 A1 | 8/2016 | Chan et al. | |
| 2016/0294643 A1 | 10/2016 | Kim | |
| 2017/0039089 A1 | 2/2017 | Xia et al. | |
| 2017/0177396 A1* | 6/2017 | Palermo | H04L 49/70 |
| 2017/0279672 A1* | 9/2017 | Krishnan | G06F 9/45558 |
| 2017/0300437 A1 | 10/2017 | Shi et al. | |
| 2018/0210752 A1 | 7/2018 | Tang et al. | |
| 2018/0373895 A9* | 12/2018 | Durham | G06F 21/53 |
| 2019/0129874 A1 | 5/2019 | Huang et al. | |
| 2019/0266006 A1 | 8/2019 | Cao et al. | |
| 2020/0226776 A1 | 7/2020 | Toma et al. | |

FOREIGN PATENT DOCUMENTS

| | | |
|---|---|---|
| CN | 103399758 A | 11/2013 |
| CN | 104951353 A | 9/2015 |
| CN | 105159753 A | 12/2015 |
| CN | 105262664 A | 1/2016 |
| CN | 105577801 A | 5/2016 |
| CN | 105579959 A | 5/2016 |
| CN | 105979007 A | 9/2016 |
| CN | 108073423 A * | 5/2018 ......... G06F 9/44521 |

OTHER PUBLICATIONS

Machine Translation and Abstract of Chinese Publication No. CN103092678, May 8, 2013, 20 pages.
Machine Translation and Abstract of Chinese Publication No. CN103399758, Nov. 20, 2013, 21 pages.
Machine Translation and Abstract of Chinese Publication No. CN105979007, Sep. 28, 2016, 33 pages.
"Network Functions Virtualisation (NFV); Acceleration Technologies; Report on Acceleration Technologies and Use Cases," ETSI GS NFV-IFA001, V1.1.1, Dec. 2015, 38 pages.
"Network Functions Virtualisation (NFV); Acceleration Technologies; Management Aspects Specification," ETSI GS NFV-IFA 004, V2.1.1, Apr. 2016, 24 pages.
"Network Functions Virtualisation (NFV); NFV Acceleration; Acceleration Resource Management Interface Specification," ETSI GS NFV-IFA 019, V0.5.3, Apr. 2017, 44 pages.
"OpenStack Enhanced Platform Awareness," White Paper, Sep. 25, 2015, 8 pages.
"Nomad," Retrieved from https://wiki.openstack.org/wiki/Nomad, Jun. 18, 2019, 5 pages.
Foreign Communication From a Counterpart Application, PCT Application No. PCT/CN2017/105880, English Translation of International Search Report dated Dec. 22, 2017, 2 pages.
Foreign Communication From a Counterpart Application, PCT Application No. PCT/CN2017/105880, English Translation of Written Opinion dated Dec. 22, 2017, 4 pages.
Foreign Communication From a Counterpart Application, PCT Application No. PCT/CN2017/105878, English Translation of International Search Report dated Jan. 23, 2018, 2 pages.
Foreign Communication From a Counterpart Application, PCT Application No. PCT/CN2017/105878, English Translation of Written Opinion dated Jan. 23, 2018, 4 pages.
Krsul, I., et al., "VMPlants: Providing and Managing Virtual Machine Execution Environments for Grid Computing," XP058095912, Proceedings of the 2004 ACM/IEEE Conference on Supercomputing, Nov. 6, 2004, 12 pages.
Foreign Communication From a Counterpart Application, European Application No. 17870073.8, Extended European Search Report dated Nov. 14, 2019, 9 pages.
Foreign Communication From a Counterpart Application, Chinese Application No. 201610989130.1, Chinese Office Action and English Translation dated Aug. 5, 2019, 12 pages.
Foreign Communication From a Counterpart Application, Chinese Application No. 201610989129.9, Chinese Office Action and English Translation dated Apr. 1, 2019, 11 pages.

* cited by examiner

| Identifier of a host | Identifier of an accelerator | Accelerator model | Acceleration function | Acceleration performance | Descriptor of an image | Mark of a feature group | Attribute of an accelerator | Status of an accelerator |
|---|---|---|---|---|---|---|---|---|
| H1 | A11 | M11 | Layer 3 forwarding | 10 Gbps | D1 | 1 | Unloadable | Allocated |
| H1 | A12 | M12 | VXLAN forwarding | 20 Gbps | D2 | 0 | Loadable | Idle |
| H1 | A12 | M12 | VXLAN forwarding | 10 Gbps | D3 | 1 | Loadable | Idle |
| H2 | A21 | M21 | Encryption | 20 Gbps | D4 | 1 | Loadable | Locked |
| H3 | A31 | M31 | VXLAN forwarding | 20 Gbps | D5 | 0 | Loadable | Idle |
| ... | ... | ... | ... | ... | ... | ... | ... | ... |

Columns "Acceleration function" and "Acceleration performance" together form the Feature group. 

FIG. 5A

| Identifier of a host | Identifier of an accelerator | Accelerator model | Acceleration function | Acceleration performance | Descriptor of an image | Mark of a feature group | Attribute of an accelerator | Status of an accelerator |
|---|---|---|---|---|---|---|---|---|
| H1 | A11 | M11 | Layer 3 forwarding | 10 Gbps | D1 | 1 | Unloadable | Allocated |
| H1 | A12 | M12 | VXLAN forwarding | 20 Gbps | D2 | 1 | Loadable | Locked |
| H1 | A12 | M12 | VXLAN forwarding | 10 Gbps | D3 | 0 | Loadable | Locked |
| H2 | A21 | M21 | Encryption | 20 Gbps | D4 | 1 | Loadable | Locked |
| H3 | A31 | M31 | VXLAN forwarding | 20 Gbps | D5 | 0 | Loadable | Idle |
| ... | ... | ... | ... | ... | ... | ... | ... | ... |

Feature group

FIG. 5B

| Identifier of a host | Identifier of an accelerator | Accelerator model | Acceleration function | Acceleration performance | Descriptor of an image | Mark of a feature group | Attribute of an accelerator | Status of an accelerator |
|---|---|---|---|---|---|---|---|---|
| H1 | A11 | M11 | Layer 3 forwarding | 10 Gbps | D1 | 1 | Unloadable | Allocated |
| | A12 | M12 | VXLAN forwarding | 20 Gbps | D2 | 1 | Loadable | Locked |
| | | | VXLAN forwarding | 10 Gbps | D3 | 0 | | |
| H2 | A21 | M21 | Encryption | 20 Gbps | D4 | 1 | Loadable | Locked |
| | | | VXLAN forwarding | 20 Gbps | D5 | 0 | | |
| H3 | A31 | M31 | VXLAN forwarding | 40 Gbps | D6 | 0 | Loadable | Idle |
| ... | ... | ... | ... | ... | ... | ... | ... | ... |

Feature group

FIG. 5C

DYNAMIC HARDWARE ACCELERATOR SELECTION AND LOADING BASED ON ACCELERATION REQUIREMENTS

CROSS-REFERENCE TO RELATED APPLICATIONS

This application is a continuation application of Int'l Patent App. No. PCT/CN2017/105878 filed on Oct. 12, 2017, which claims priority to Chinese Patent App. No. 201610989130.1 filed on Nov. 9, 2016, which are incorporated by reference.

TECHNICAL FIELD

The disclosure relates to acceleration technologies, and in particular, to an accelerator loading method, system, and apparatus.

BACKGROUND

A network of a network operator usually includes various large-scale and rapidly increasing hardware devices. A new-type device is usually required to develop a new network service or network function. It is increasingly difficult to search for space and provide a power supply for the new-type device. More seriously, a hardware lifecycle becomes increasingly short while service creation is accelerated. This suppresses deployment of new value-added services, and limits ever-increasing innovation centered on a network.

Network functions virtualization (NFV) implements, by using virtualization technologies, combination of many types of network devices into high-capacity servers, switches, or storage devices that meet an industrial standard. The servers, the switches, or the storage devices may be deployed in a data center, a network node, or a client. The NFV implements flexible software loading, and therefore increases a network deployment and adjustment speed, reduces service deployment complexity, and improves unification, universalization, and adaptation of network devices.

An NFV architecture uses industrial standard hardware, and there is a problem of performance deterioration when the standard hardware processes a large quantity of network functions. Therefore, to resolve the problem that the performance of the NFV architecture deteriorates, NFV hardware acceleration becomes an important research direction. Specifically, hardware acceleration means that a specific network function is implemented by using dedicated and more efficient hardware, and the hardware that implements the function is referred to as an accelerator.

Currently, an acceleration function may be provided in two manners: In a first manner, an accelerator manufacturer provides fixed-function acceleration. In a second manner, an accelerator manufacturer provides an image having an acceleration function, a loading function of the image is provided in a driver provided by the manufacturer, and the image is locally loaded in a server. In this way, the server can implement different acceleration functions by loading images having different functions.

However, when loading an image, an existing accelerator can load only an image having a specific function, and cannot dynamically load different images as required and cannot implement different functions. In this way, when different acceleration functions are required, corresponding hardware accelerators need to be provided, and consequently resources are wasted.

SUMMARY

To resolve the foregoing problem, the disclosure provides an accelerator loading method, system, and apparatus, so that an image that meets an acceleration requirement of a to-be-created virtual machine can be dynamically loaded for an accelerator, thereby implementing accelerator allocation as required, and saving hardware resources.

According to a first aspect of the disclosure, an accelerator loading method is provided, and is applied to an accelerator loading apparatus. The accelerator loading apparatus obtains an acceleration requirement, where the acceleration requirement includes an acceleration function of a to-be-created virtual machine and acceleration performance of the to-be-created virtual machine. The accelerator loading apparatus determines a target accelerator that meets the acceleration function of the to-be-created virtual machine and the acceleration performance of the to-be-created virtual machine, and determines an image corresponding to the target accelerator. The accelerator loading apparatus sends an image loading command to a target host in which the target accelerator is located. The image loading command includes a descriptor of the image and an identifier of the target accelerator, the image loading command is used to enable the target host to load the image for the target accelerator based on the image loading command, and the descriptor of the image includes at least one of an identifier of the image and a location of the image.

In the foregoing manner, an image that meets the acceleration requirement may be loaded for the target accelerator based on the acceleration requirement of the to-be-created virtual machine, so that the target accelerator has a function corresponding to the acceleration requirement, thereby implementing accelerator allocation as required.

In a first implementation of the first aspect, when determining the target accelerator that meets the acceleration function of the to-be-created virtual machine and the acceleration performance of the to-be-created virtual machine, the accelerator loading apparatus searches an acceleration database based on the acceleration function of the to-be-created virtual machine and the acceleration performance of the to-be-created virtual machine, and determines at least one candidate host that can provide at least one available accelerator that meets the acceleration function of the to-be-created virtual machine and the acceleration performance of the to-be-created virtual machine, and information about an available accelerator of each candidate host. The accelerator loading apparatus determines one of the at least one candidate host as the target host, and determines an available accelerator of the target host as the target accelerator. The acceleration database is configured to store acceleration information of each host managed by the accelerator loading apparatus. The acceleration information of each host includes an identifier of the host, an identifier of each accelerator of the host, an accelerator model of the accelerator, a feature group of the accelerator, an attribute of the accelerator, and a status of the accelerator, the feature group of the accelerator includes an acceleration function of the accelerator and acceleration performance of the accelerator, and the attribute of the accelerator is used to indicate whether the accelerator can dynamically load an image.

In the disclosure, the acceleration database stores the acceleration information of each host, and the accelerator loading apparatus can find the candidate host based on the acceleration function and the acceleration performance of the to-be-created virtual machine, and further determine the target host from the candidate host and the target accelerator corresponding to the target host. In the foregoing first implementation, the accelerator loading apparatus can find a most appropriate accelerator for the to-be-created virtual machine, so that operating efficiency of a system can be generally improved.

Based on the first implementation of the first aspect, in a second implementation of the first aspect, when determining the at least one candidate host that can provide the available accelerator that meets the acceleration function of the to-be-created virtual machine and the acceleration performance of the to-be-created virtual machine, the accelerator loading apparatus is configured to obtain a host list corresponding to the acceleration requirement, where the host list includes an identifier of at least one host that meets the acceleration requirement. The accelerator loading apparatus searches the acceleration database based on the host list, the acceleration function of the to-be-created virtual machine, and the acceleration performance of the to-be-created virtual machine, and determines the at least one candidate host that is in the host list and that can provide the available accelerator that meets the acceleration function of the to-be-created virtual machine and the acceleration performance of the to-be-created virtual machine.

In actual deployment, the accelerator loading apparatus may manage a large quantity of hosts. Therefore, there may be a plurality of hosts that meet the acceleration function and the acceleration performance of the to-be-created virtual machine. Selecting these hosts as candidate hosts may avoid problems such as network congestion and system performance deterioration that are caused by loading an image to a host that cannot meet the acceleration requirement.

Based on the second implementation of the first aspect, in a third implementation of the first aspect, when obtaining the acceleration requirement, the accelerator loading apparatus obtains a request for creating a virtual machine. The request for creating a virtual machine includes a computing resource requirement of the to-be-created virtual machine, a storage resource requirement of the to-be-created virtual machine, and the acceleration requirement, and the acceleration requirement is an acceleration requirement of the to-be-created virtual machine. When obtaining the host list corresponding to the acceleration requirement, the accelerator loading apparatus searches, based on the computing resource requirement and the storage resource requirement, all hosts managed by the accelerator loading apparatus for one or more hosts that can meet the computing resource requirement and the storage resource requirement, and generates, based on identifiers of the one or more hosts, the host list corresponding to the acceleration requirement.

In the disclosure, the accelerator loading apparatus determines the host list based on the storage resource requirement of the to-be-created virtual machine and the computing resource requirement of the to-be-created virtual machine, to ensure that a found host can support a service requirement of the to-be-created virtual machine.

Based on any one of the first to the third implementations of the first aspect, in a fourth implementation of the first aspect, when determining one of the at least one candidate host as the target host, the accelerator loading apparatus selects one of the at least one candidate host as the target host based on a host filtering rule.

The to-be-created virtual machine can be finally created on only one target host. Therefore, if there are a plurality of candidate hosts that meet various requirements of the to-be-created virtual machine, the accelerator loading apparatus selects a most appropriate target host from the plurality of candidate hosts based on the host filtering rule, so that load balancing can be implemented or system efficiency can be maximized.

Based on any one of the first to the fourth implementations of the first aspect, in a fifth implementation of the first aspect, the acceleration database further includes a descriptor of an image corresponding to a feature group of each accelerator. When determining the image corresponding to the target accelerator, the accelerator loading apparatus determines a target feature group of the target accelerator and a descriptor of an image corresponding to the target feature group, and uses the image corresponding to the target feature group as the image of the target accelerator. An acceleration function of the target feature group is the acceleration function of the to-be-created virtual machine, and acceleration performance of the target feature group is the acceleration performance of the to-be-created virtual machine.

Based on the fifth implementation of the first aspect, in a sixth implementation of the first aspect, the acceleration database further includes a mark of each feature group, and the mark of the feature group is used to indicate whether an acceleration function of the feature group is a current function of an accelerator corresponding to the feature group. When searching the acceleration database, and determining the target feature group of the target accelerator and the descriptor of the image corresponding to the target feature group, the accelerator loading apparatus searches the acceleration database, and determines that the target accelerator meets a loading condition. That the target accelerator meets a loading condition includes: The acceleration function of the target feature group is not a current function of the target accelerator, and a state of the target accelerator is "idle".

In the foregoing implementation, the accelerator loading apparatus determines that an accelerator for which the acceleration function of the target feature group is not the current function of the target accelerator, and the state of the target accelerator is "idle" is an accelerator that meets the loading condition, so that a resource waste caused by loading the image to an accelerator that has loaded an image meeting the acceleration requirement.

Based on the sixth implementation of the first aspect, in a seventh implementation of the first aspect, an image request sent by the target host is received, where the image request includes the descriptor of the image. The accelerator loading apparatus obtains the image from an accelerator image repository based on the descriptor of the image, and sends the image to the target host. The accelerator image repository is configured to store an image and image information, where image information of each image includes a descriptor of the image, an accelerator model corresponding to the image, an acceleration function that can be provided by the image, and acceleration performance that can be provided by the image.

After sending the image to the target host, the accelerator loading apparatus receives a notification message sent by the target host. The notification message includes an identifier of the target host, the identifier of the target accelerator, the acceleration function of the to-be-created virtual machine, and the acceleration performance of the to-be-created virtual machine. The accelerator loading apparatus updates the acceleration database based on the acceleration function of the to-be-created virtual machine and the acceleration performance of the to-be-created virtual machine, changes the state of the target accelerator into "locked", and sets the acceleration function of the to-be-created virtual machine as the current function of the target accelerator.

The accelerator loading apparatus updates the acceleration database, so that information in the acceleration database can reflect latest statuses of accelerators on all hosts in real time, thereby accurately searching for the accelerator, and avoiding an image loading failure caused by non-timely information updating.

In the disclosure, the accelerator loading apparatus may receive a new image at any time, and store the new image and image information of the new image in the accelerator image repository. The image information of the new image includes a descriptor of the new image, an accelerator model corresponding to the new image, an acceleration function that can be provided by the new image, and acceleration performance that can be provided by the new image. Then, the accelerator loading apparatus searches the acceleration database based on the accelerator model corresponding to the new image, and adds, in the acceleration database, the descriptor of the new image and a feature group including the acceleration function of the new image and the acceleration performance of the new image for each accelerator that supports the accelerator model corresponding to the new image.

In the disclosure, the accelerator loading apparatus receives the new image, and separately updates the information related to the new image in the accelerator image repository and the acceleration database, so that the information about the new image can be shown in the acceleration database, thereby improving accuracy of the target accelerator that is found when the target accelerator that meets the acceleration function of the to-be-created virtual machine and the acceleration performance of the to-be-created virtual machine is determined, and avoiding network congestion or system performance deterioration that is caused by loading the image to an inappropriate accelerator.

According to a second aspect of the disclosure, an accelerator loading apparatus is provided, including a compute management function, an acceleration management controller, an accelerator image repository, and an acceleration database. The foregoing components cooperate to implement the method in the first aspect and each implementation of the first aspect.

According to a third aspect of the disclosure, an accelerator loading system is provided, including the accelerator loading apparatus in the second aspect and at least one host. The at least one host includes a target host determined by the accelerator loading apparatus.

According to a fourth aspect of the disclosure, another accelerator loading apparatus is provided, including a processor, a first memory, a second memory, and a communications interface. The first memory is configured to store compute management program code and acceleration management program code, and the second memory is configured to store an accelerator image repository and an acceleration database. The processor is configured to: invoke the compute management program code to implement the compute management function in the first aspect and the second aspect, and invoke the acceleration management program code to implement the functions of the acceleration management controller in the first aspect and the second aspect. In a process of invoking the compute management program code and/or the acceleration management program code, the processor further performs an operation such as searching, reading, or updating on the accelerator image repository and/or the acceleration database as required.

According to a fifth aspect of the disclosure, a storage medium is provided, and is configured to store computer program code. When the computer program code runs, the method in the first aspect and each implementation of the first aspect in the disclosure can be implemented.

In the disclosure, a target host that can create the virtual machine may be determined based on the acceleration function and the acceleration performance of the to-be-created virtual machine, and an image used for acceleration is loaded to an available accelerator of the target host, so as to implement dynamic accelerator loading and deployment.

BRIEF DESCRIPTION OF DRAWINGS

To describe technical solutions in embodiments of the disclosure more clearly, the following briefly describes the accompanying drawings for describing the embodiments.

FIG. 5A is a schematic structural diagram of an acceleration database according to an embodiment of the disclosure;

FIG. 5B is a schematic structural diagram of an updated acceleration database according to an embodiment of the disclosure;

FIG. 5C is a schematic diagram of an acceleration database shown in FIG. 5B that is updated based on image information of a new image.

DESCRIPTION OF EMBODIMENTS

The disclosure is described below in detail with reference to the accompanying drawings.

Figure 1:
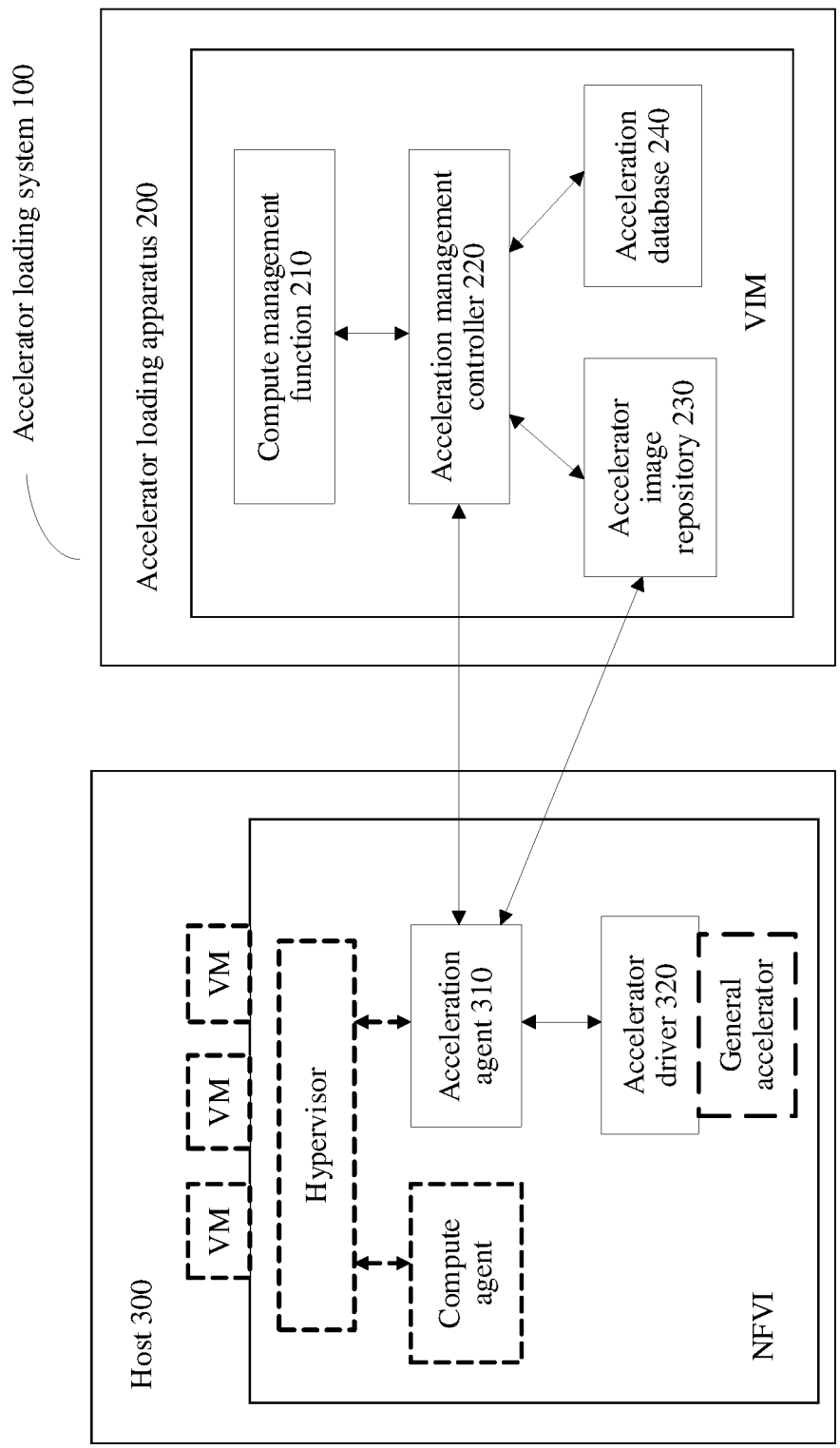
FIG. 1 is a schematic structural diagram of an accelerator loading system according to an embodiment of the disclosure.

As shown in FIG. 1, FIG. 1 is a schematic structural diagram of an accelerator loading system 100 according to an embodiment of the disclosure. The accelerator loading system 100 includes an accelerator loading apparatus 200 and one or more hosts 300. For ease of description, one host 300 is used an example in FIG. 1. A virtualized infrastructure manager (VIM) is deployed on the accelerator loading apparatus 200, and an NFV infrastructure (NFVI) is deployed on the host 300. The VIM is configured to control and manage computation, storage, and network resources of all NFVIs, and each NFVI includes hardware and software components configured to establish an operating environment of a virtualized network function (VNF). Both the VIM and the NFVI are logic concepts, are merely used to describe an application scenario in this embodiment of the disclosure, and do not constitute a limitation on the disclosure. The VIM includes a compute management function 210, an acceleration management controller 220, an accelerator image repository 230, and an acceleration database 240. The accelerator image repository 230 and the acceleration database 240 may be stored in a same memory, or may be respectively stored in different memories. The NFVI includes an acceleration agent 310 and one or more accelerator drivers 320. Each accelerator driver 320 is corresponding to a general accelerator, and the general accelerator can dynamically load an image used to implement a specific function. The host 300 may further include a system management program, namely, a hypervisor, and a compute agent. The hypervisor generates at least one virtual machine (VM) on the host 300, and the compute agent is configured to communicate with the hypervisor to manage the at least one VM.

When the accelerator loading system 100 runs, the accelerator loading apparatus 200 obtains an acceleration requirement, where the acceleration requirement includes an acceleration function and acceleration performance of a to-be-created virtual machine such as a first VM. The accelerator loading apparatus 200 determines a target accelerator that meets the acceleration function of the to-be-created virtual machine and the acceleration performance of the to-be-created virtual machine, determines an image corresponding to the target accelerator, and sends an image loading command to a target host in which the target accelerator is located, for example, the host 300. The image loading command includes a descriptor of the image and an identifier of the target accelerator, and the descriptor of the image includes at least one of an identifier of the image and a location of the image. The host 300 receives the image loading command, and loads the image for the target accelerator based on the image loading command.

When determining the target accelerator that meets the acceleration function of the to-be-created virtual machine and the acceleration performance of the to-be-created virtual machine, the accelerator loading apparatus 200 searches the acceleration database 240 based on the acceleration function of the to-be-created virtual machine and the acceleration performance of the to-be-created virtual machine, and determines at least one candidate host that can provide an available accelerator that meets the acceleration function of the to-be-created virtual machine and the acceleration performance of the to-be-created virtual machine, and information about an available accelerator of each candidate host. The accelerator loading apparatus 200 determines one of the at least one candidate host as the target host, for example, the host 300, and determines an available accelerator of the target host as the target accelerator.

The acceleration database 240 is configured to store acceleration information of each host managed by the accelerator loading apparatus. The acceleration information of each host includes an identifier of the host, an identifier of each accelerator of the host, an accelerator model of the accelerator, a feature group of the accelerator, an attribute of the accelerator, and a status of the accelerator, the feature group of the accelerator includes an acceleration function of the accelerator and acceleration performance of the accelerator, and the attribute of the accelerator is used to indicate whether the accelerator can dynamically load an image. The acceleration database 240 is subsequently described in detail with reference to the accompanying drawings.

When determining the at least one candidate host that can provide the available accelerator that meets the acceleration function of the to-be-created virtual machine and the acceleration performance of the to-be-created virtual machine, the accelerator loading apparatus 200 obtains a host list corresponding to the acceleration requirement. The host list includes an identifier of at least one host that meets the acceleration requirement. The accelerator loading apparatus 200 searches the acceleration database 240 based on the host list, the acceleration function of the to-be-created virtual machine, and the acceleration performance of the to-be-created virtual machine, and determines the at least one candidate host that is in the host list and that can provide the available accelerator that meets the acceleration function of the to-be-created virtual machine and the acceleration performance of the to-be-created virtual machine.

In an implementation, when obtaining the acceleration requirement, the accelerator loading apparatus 200 obtains a request for creating a virtual machine. The request for creating a virtual machine includes a computing resource requirement of the to-be-created virtual machine, a storage resource requirement of the to-be-created virtual machine, and the acceleration requirement, and the acceleration requirement is an acceleration requirement of the to-be-created virtual machine. When obtaining the host list corresponding to the acceleration requirement, the accelerator loading apparatus 200 searches, based on the computing resource requirement of the to-be-created virtual machine and the storage resource requirement of the to-be-created virtual machine, all hosts managed by the accelerator loading apparatus for one or more hosts that can meet the computing resource requirement and the storage resource requirement, and generates, based on identifiers of the one or more hosts, the host list corresponding to the acceleration requirement.

When determining one of the at least one candidate host as the target host, the accelerator loading apparatus 200 selects one of the at least one candidate host as the target host based on a host filtering rule. The host filtering rule means: When a plurality of hosts meet the acceleration requirement, one of the plurality of hosts is selected. The host filtering rule may be selecting a host with minimum load. The host filtering rule may also be referred to as an acceleration resource constraint.

The acceleration database 240 further includes a descriptor of an image corresponding to a feature group of each accelerator. When determining the image corresponding to the target accelerator, the accelerator loading apparatus 200 determines a target feature group of the target accelerator and a descriptor of an image corresponding to the target feature group, and uses the image corresponding to the target feature group as the image of the target accelerator. An acceleration function of the target feature group is the acceleration function of the to-be-created virtual machine, and acceleration performance of the target feature group is the acceleration performance of the to-be-created virtual machine.

Further, the acceleration database 240 further includes a mark of each feature group, and the mark of the feature group is used to indicate whether an acceleration function of the feature group is a current function of an accelerator corresponding to the feature group. Before searching the acceleration database, and determining the target feature group of the target accelerator and the descriptor of the image corresponding to the target feature group, the accelerator loading apparatus 200 further searches the acceleration database, and determines that the target accelerator meets a loading condition. That the target accelerator meets a loading condition includes: The acceleration function of the target feature group is not a current function of the target accelerator, and a state of the target accelerator is "idle".

The host 300 sends an image request to the accelerator loading apparatus 200, where the image request includes the descriptor of the image. The accelerator loading apparatus 200 receives the image request, obtains the image from the accelerator image repository 230 based on the descriptor of the image, and sends the image to the target host. The accelerator image repository 230 is configured to store an image and image information, and image information of each image includes a descriptor of the image, an accelerator model corresponding to the image, an acceleration function that can be provided by the image, and acceleration performance that can be provided by the image. The accelerator image repository 230 is subsequently described in detail with reference to the accompanying drawings.

After the image is loaded, the host 300 further sends a notification message to the accelerator loading apparatus 200. The notification message includes an identifier of the host 300, the identifier of the target accelerator, the acceleration function of the to-be-created virtual machine, and the acceleration performance of the to-be-created virtual machine. The accelerator loading apparatus 200 receives the notification message, updates the acceleration database based on the acceleration function of the to-be-created virtual machine and the acceleration performance of the to-be-created virtual machine, changes the state of the target accelerator into "locked", and sets the acceleration function of the to-be-created virtual machine as the current function of the target accelerator.

A developer may constantly develop a new image to update a function of an accelerator. Therefore, the accelerator loading apparatus 200 further receives a new image, and stores the new image and image information of the new image in the accelerator image repository 230. The image information of the new image includes a descriptor of the new image, an accelerator model corresponding to the new image, an acceleration function that can be provided by the new image, and acceleration performance that can be provided by the new image. The accelerator loading apparatus 200 searches the acceleration database based on the accelerator model corresponding to the new image, and adds, in the acceleration database, the descriptor of the new image and a feature group including the acceleration function of the new image and the acceleration performance of the new image for each accelerator that supports the accelerator model corresponding to the new image.

The accelerator loading apparatus 200 and the host 300 may be in a same physical server, or may be in different physical servers.

Based on the accelerator loading system shown in FIG. 1, the disclosure provides an accelerator loading method, and the method is performed by the accelerator loading apparatus 200 in FIG. 1. In an embodiment, the method includes steps shown in FIG. 2.

In S201, the accelerator loading apparatus 200 obtains an acceleration requirement, where the acceleration requirement includes an acceleration function and acceleration performance that are required by a to-be-created virtual machine.

In S202, the accelerator loading apparatus 200 determines a target accelerator that meets the acceleration function and the acceleration performance.

In S203, the accelerator loading apparatus 200 determines an image corresponding to the target accelerator.

In S204, the accelerator loading apparatus 200 sends an image loading command to a target host 300 in which the target accelerator is located, where the image loading command includes a descriptor of the image and an identifier of the target accelerator, and the image loading command is used to enable the target host 300 to load the image for the target accelerator based on the image loading command.

Figure 2:
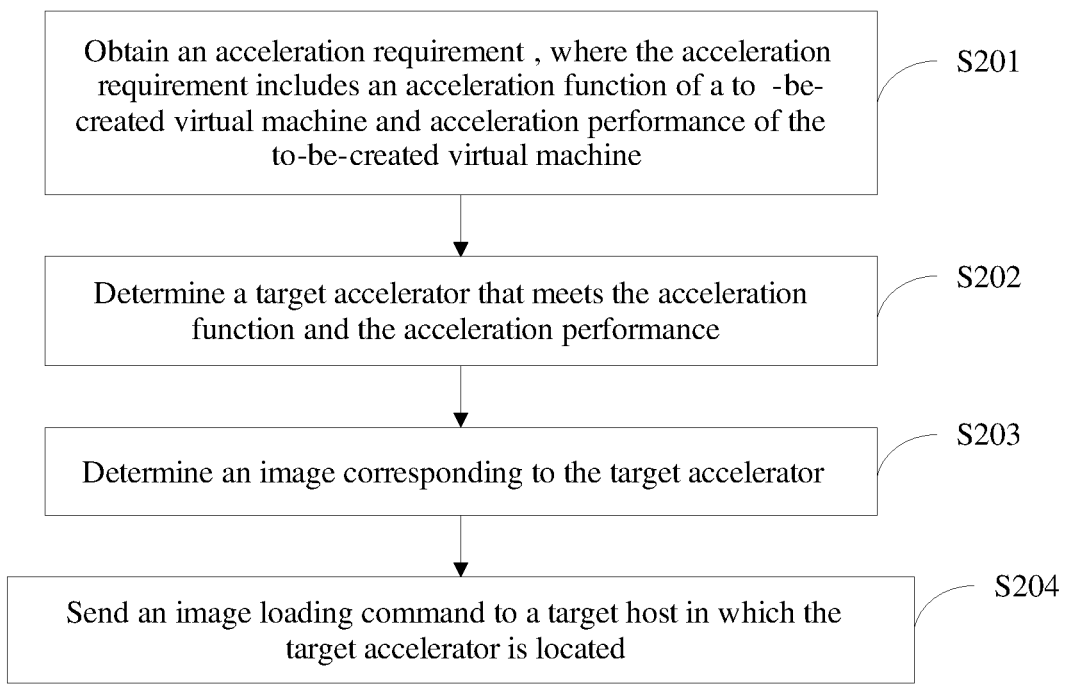
FIG. 2 is a schematic flowchart of an accelerator loading method according to an embodiment of the disclosure.

For specific implementations of the steps in the method shown in FIG. 2, refer to the description, of the accelerator loading apparatus 200, provided when the accelerator loading system shown in FIG. 1 is described.

In the foregoing manner, the accelerator loading apparatus determines the target accelerator that meets the acceleration function and the acceleration performance of the to-be-created virtual machine, and loads, for the target accelerator, an image that meets the acceleration function and the acceleration performance, thereby implementing accelerator allocation as required, and avoiding a hardware resource waste caused by configuring a corresponding hardware accelerator for each acceleration function.

The accelerator loading system shown in FIG. 1 and the accelerator loading method shown in FIG. 2 are described below in detail with reference to FIG. 3.

Figure 3:
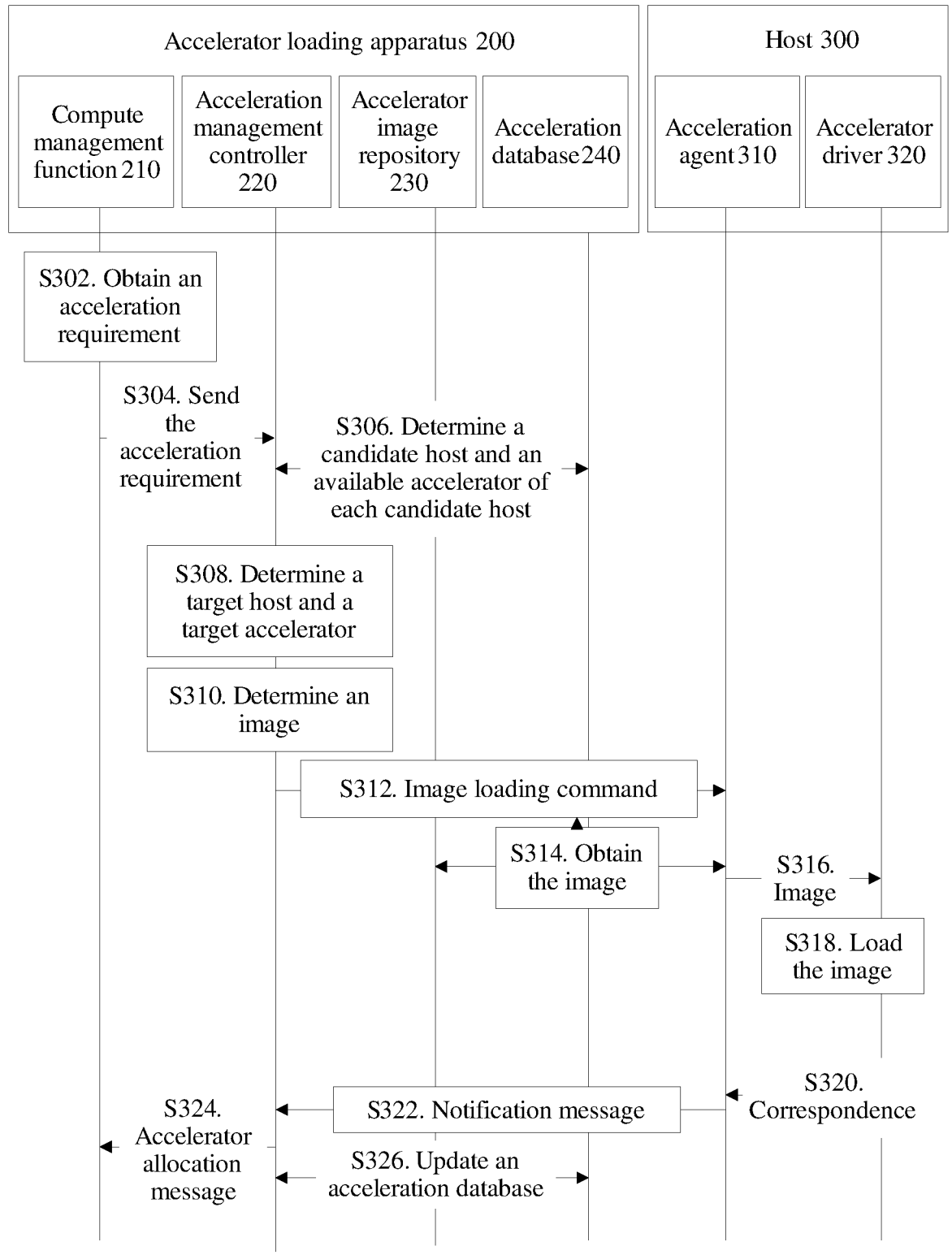
FIG. 3 is a schematic flowchart of another accelerator loading method according to an embodiment of the disclosure.

When S201 is implemented, the compute management function 210 of the accelerator loading apparatus 200 performs S302 in FIG. 3.

In S302, the compute management function 210 obtains a request for creating a virtual machine, where the request for creating a virtual machine includes an acceleration requirement of the to-be-created virtual machine, and the acceleration requirement includes the acceleration function of the to-be-created virtual machine and the acceleration performance of the to-be-created virtual machine.

The request for creating a virtual machine may further include a computing resource requirement of the to-be-created virtual machine and a storage resource requirement of the to-be-created virtual machine.

The request for creating a virtual machine may be triggered when a user needs to deploy a virtual machine. For example, the computing resource requirement may be a specification of a central processing unit (CPU) required by the to-be-created virtual machine. The specification may include a quantity of compute engines (or referred to as cores) included in the CPU. For example, the storage resource requirement may be a size of storage space required by the to-be-created virtual machine, for example, 120 GB. For example, the acceleration function of the to-be-created virtual machine may include encryption or decryption, compression or decompression, layer 3 forwarding, and virtual extensible local area network (VXLAN) forwarding. The acceleration performance includes a speed at which the function is implemented, for example, a rate of the VXLAN forwarding: 20 gigabits per second (Gbps). Further, when the acceleration function of the to-be-created virtual machine is a forwarding function, the request for creating a virtual machine may further include a specification of a forwarding table, namely, a maximum quantity of entries of the forwarding table.

When S202 is implemented, the compute management function 210 and the acceleration management controller 220 of the accelerator loading apparatus 200 perform S304, S306, and S308 in FIG. 3.

In S304, the compute management function 210 sends the acceleration requirement of the to-be-created virtual machine to the acceleration management controller 220, where the acceleration requirement of the to-be-created virtual machine includes the acceleration function of the to-be-created virtual machine and the acceleration performance of the to-be-created virtual machine.

For example, the acceleration function of the to-be-created virtual machine that is included in the acceleration requirement of the to-be-created virtual machine is the VXLAN forwarding, and the acceleration performance of the to-be-created virtual machine is 20 Gbps.

In S306, the acceleration management controller 220 searches the acceleration database 240 based on the acceleration function of the to-be-created virtual machine and the acceleration performance of the to-be-created virtual machine, and determines at least one candidate host that can provide an available accelerator that meets the acceleration function and the acceleration performance, and information about an available accelerator of each candidate host.

The information about the available accelerator is referred to as a profile of the available accelerator, and information about each available accelerator includes an identifier of a host in which the available accelerator is located, an accelerator model of the available accelerator, and an identifier (ID) of the available accelerator.

The acceleration database 240 is configured to store acceleration information of each host managed by the accelerator loading apparatus. The acceleration information of each host includes an identifier of the host, an identifier of each accelerator of the host, an accelerator model of the accelerator, a feature group of the accelerator, an attribute of the accelerator, and a status of the accelerator, and the feature group of the accelerator includes an acceleration function of the accelerator and acceleration performance of the accelerator.

The attribute of the accelerator is used to indicate whether the accelerator can dynamically load an image. The attribute of the accelerator includes "loadable" and "unloadable", "loadable" means that the accelerator can dynamically load different images to implement different acceleration functions, and "unloadable" means that a function of the accelerator is fixed or the accelerator can load only a specific image.

The status of the accelerator includes four types: "allocated", "locked", and "idle". An allocated accelerator is an accelerator that has been used by a virtual machine. A locked accelerator is an accelerator that has loaded an image and that is to be allocated to a virtual machine for use. The locked accelerator cannot load a new image. An idle accelerator is an accelerator that can load an image. The idle accelerator may be an accelerator that has loaded an image and whose loaded image is released, or may be an accelerator that loads no image. A released idle accelerator may be directly allocated to another virtual machine for use, or may re-load an image corresponding to another acceleration function and other acceleration performance that are supported by the accelerator.

In the disclosure, an accelerator whose attribute is "loadable" and state is "idle" is referred to as an available accelerator. In the disclosure, an acceleration function and acceleration performance that are corresponding to an accelerator whose state is "allocated" or "locked" are an acceleration function and acceleration performance that can be actually provided by the accelerator. An acceleration function and acceleration performance that are corresponding to an accelerator whose attribute is "loadable" and state is "idle" are an acceleration function and acceleration performance that can be theoretically supported by the accelerator. In the disclosure, one accelerator may theoretically support a plurality of types of acceleration performance corresponding to a plurality of acceleration functions.

Further, the acceleration database 240 further includes a descriptor of an image corresponding to a feature group of each accelerator and a mark of each feature group, and the mark of the feature group is used to indicate whether an acceleration function of the feature group is a current function of an accelerator corresponding to the feature group. For example, in this application, a mark 1 indicates that the acceleration function of the feature group is the current function of the accelerator corresponding to the feature group, and a mark 0 indicates that the acceleration function of the feature group is not the current function of the accelerator corresponding to the feature group.

As shown in FIG. 5A, FIG. 5A is a schematic diagram of an acceleration database 240 according to an embodiment of the disclosure. The acceleration database 240 stores information about an accelerator corresponding to each host. FIG. 5A shows three hosts. A host H1 has two accelerators: A11 and A12. The accelerator A11 is an unloadable accelerator, and has been allocated to a virtual machine for acceleration of layer 3 forwarding. The accelerator A11 supports only one feature group {layer 3 forwarding, 10 Gbps}. A mark corresponding to the feature group is 1, and it indicates that a layer 3 forwarding function in the feature group is a current function of the accelerator A12. The accelerator A12 is a loadable accelerator, and supports two feature groups that are respectively a feature group {VXLAN forwarding, 20 Gbps} and a feature group {VXLAN forwarding, 10 Gbps}. A mark of the feature group {VXLAN forwarding, 10 Gbps} is 1, and it indicates that an image corresponding to the feature group {VXLAN forwarding, 10 Gbps} has been loaded to the accelerator A12. An accelerator state of the accelerator A12 is "idle", and it indicates that although the accelerator A12 has been used by a virtual machine, the accelerator A12 is released by the virtual machine. The accelerator A12 may be directly allocated to a virtual machine whose acceleration function is the VXLAN forwarding and acceleration performance is 10 Gbps for use, or may re-load an image. A host H2 has one accelerator A21, and the accelerator A21 supports only one feature group {encryption, 20 Gbps}. A mark corresponding to the feature group is 1, and an accelerator state of the accelerator A21 is "locked". It indicates that the accelerator A21 has loaded an image and is to be allocated to a virtual machine for use, and the accelerator A21 cannot load another image. A host H3 has one accelerator A31, and the accelerator A31 supports only one feature group {VXLAN forwarding, 20 Gbps}. A mark corresponding to the feature group is 0, and an accelerator state of the accelerator A31 is "idle". It indicates that the accelerator A31 loads no image. Image descriptors D1 to D5 respectively indicates images corresponding to different feature groups.

For example, when the acceleration function is the VXLAN forwarding, and the acceleration performance is 20 Gbps, the acceleration management controller 220 searches the acceleration database 240 shown in FIG. 5A, to determine that candidate hosts are the host H1 and the host H3, and corresponding available accelerators are the accelerator A12 of the host H1 and the accelerator A31 of the host H3.

Optionally, before S306, the method further includes: The acceleration management controller 220 searches the acceleration database 240 based on the acceleration function and the acceleration performance, and performs S306 when finding no locked accelerator that meets the acceleration requirement.

S306 may further include S306-1 and S306-2.

In S306-1, the acceleration management controller 220 obtains a host list corresponding to the acceleration requirement.

The host list includes an identifier of at least one host that meets the acceleration requirement. The identifier of the host is used to uniquely identify the host.

In an implementation of S306-1, the acceleration requirement sent by the compute management function 210 to the acceleration management controller 220 further includes the host list, where the host list includes information about all hosts that are managed by the accelerator loading apparatus 200 and that can meet the computing resource requirement of the to-be-created virtual machine and the storage resource requirement of the to-be-created virtual machine. In other words, in this implementation, S306-1 includes: The acceleration management controller 220 receives the host list corresponding to the acceleration requirement sent by the compute management function 210. The host list may be included in the acceleration requirement, or may be individually sent by the compute management function 210 to the acceleration management controller 220.

The accelerator loading apparatus 200 stores the information about all the hosts managed by the accelerator loading apparatus 200, and information about each host includes a computing resource and a storage resource that can be provided by the host. The accelerator loading apparatus 200 can manage a host configured by an administrator, and the information about all the hosts may be stored in any storage space planned by the accelerator loading apparatus 200. When obtaining the host list, the compute management function 210 searches, based on the computing resource requirement and the storage resource requirement, all the hosts for one or more hosts that can meet the computing resource requirement and the storage resource requirement, generates the host list based on identifiers of the one or more hosts, and sends the host list to the acceleration management controller 220.

In another implementation of S306-1, the acceleration requirement further includes the computing resource requirement of the to-be-created virtual machine and the storage resource requirement of the to-be-created virtual machine. The obtaining a host list corresponding to the acceleration requirement includes: searching, by the acceleration management controller 220 based on the computing resource requirement and the storage resource requirement, all hosts managed by the accelerator loading apparatus for one or more hosts that can meet the computing resource requirement and the storage resource requirement, and generating the host list based on identifiers of the one or more hosts.

In S306-2, the acceleration management controller 220 searches the acceleration database 240 based on the host list, the acceleration function of the to-be-created virtual machine, and the acceleration performance of the to-be-created virtual machine, and determines at least one candidate host that is in the host list and that can provide the available accelerator that meets the acceleration function and the acceleration performance, and the information about the available accelerator of each candidate host.

In S308, the acceleration management controller 200 determines one of the at least one candidate host as the target host, and determines an available accelerator of the target host as the target accelerator.

When there is only one candidate host, the acceleration management controller 220 directly determines the candidate host as the target host, and determines an available accelerator of the candidate host as the target accelerator.

When the candidate host includes a plurality of hosts, in an implementation of S308, the acceleration requirement further includes a host filtering rule, and S308 includes: The acceleration management controller 220 selects one of the at least one candidate host as the target host based on the host filtering rule, and determines an available accelerator of the target host as the target accelerator.

When the candidate host includes the plurality of hosts, in another implementation of S308, the acceleration requirement does not include a host filtering rule, and S308 includes the following sub-steps:

S308-1. The acceleration management controller 220 sends a candidate host notification message to the compute management function, where the candidate host notification message includes information about each candidate host of the at least one candidate host, and the information about each candidate host includes at least an identifier of the candidate host.

S308-2. The compute management function 210 selects one of the at least one candidate host as the target host based on the host filtering rule.

S308-3. The acceleration management controller 220 receives an identifier of the target host that is sent by the compute management function 210, determines the target host based on the identifier of the target host, and determines an available accelerator of the target host as the target accelerator.

For example, the acceleration management controller 220 determines the host H1 as the target host based on the host filtering rule, and determines the accelerator A12 as the target accelerator.

When S203 is implemented, the acceleration management controller 220 in the accelerator loading apparatus 200 performs S310 in FIG. 3.

In S310, the acceleration management controller 220 determines a target feature group of the target accelerator and a descriptor of an image corresponding to the target feature group, and uses the image corresponding to the target feature group as an image of the target accelerator.

An acceleration function of the target feature group is the acceleration function of the to-be-created virtual machine, and acceleration performance of the target feature group is the acceleration performance of the to-be-created virtual machine.

The acceleration management controller 220 may determine, based on a searching result in S306, the target feature group of the target accelerator and the descriptor of the image corresponding to the target feature group.

As shown in FIG. 5A, the acceleration database 240 further includes a mark of each feature group. Before S310, the method may further include: The acceleration management controller 220 searches the acceleration database, and determines that the target accelerator meets a loading condition. That the target accelerator meets a loading condition includes: The acceleration function of the target feature group is not a current function of the target accelerator, and a state of the target accelerator is "idle".

When S204 is implemented, the acceleration management controller 220 performs S312 in FIG. 3.

In S312, the acceleration management controller 220 sends an image loading command to an acceleration agent 310 of the target host, where the image loading command includes the descriptor of the image and the identifier of the target accelerator.

To load the image, as shown in FIG. 3, the acceleration agent 310 and an accelerator driver 320 in the target host 300 also correspondingly perform some operations.

In S314, the acceleration agent 310 obtains the image from the accelerator image repository 230.

Before S314, the method may further include: The acceleration agent 310 determines, based on the descriptor of the image, whether the image is locally cached, and performs S314 if the image is not cached.

In an implementation of S314, the acceleration agent 310 sends an image request to the accelerator image repository 230, where the image request includes the descriptor of the image. Then, the acceleration agent 310 receives the image sent by the accelerator image repository 230. In another implementation of S314, the acceleration agent 310 sends an image request to the acceleration management controller 220, where the image request includes the descriptor of the image. After receiving the image request, the acceleration management controller 220 accesses the accelerator image repository 230 based on the descriptor of the image, to obtain the image and sends the obtained image to the acceleration agent 310.

Figure 4A:
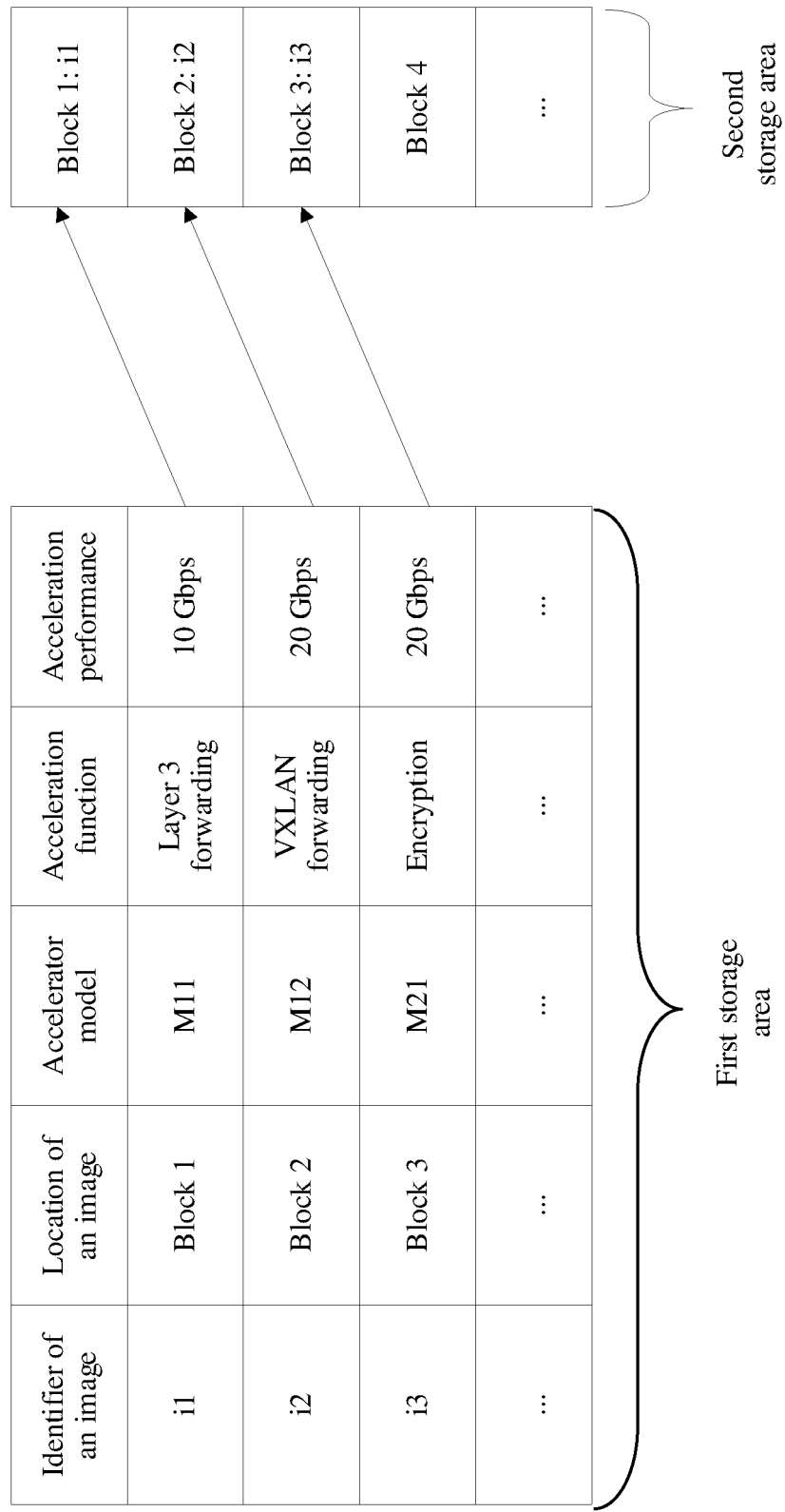
FIG. 4A is a schematic structural diagram of an accelerator image repository according to an embodiment of the disclosure.

The accelerator image repository 230 is configured to store an image and image information, and image information of each image includes a descriptor of the image, an accelerator model corresponding to the image, an acceleration function that can be provided by the image, and acceleration performance that can be provided by the image. The image is code that can implement a function after being loaded, and the descriptor of the image is at least one of an identifier of the image and a location of the image. The location of the image is a location at which the image is stored in the accelerator image repository 230. The accelerator model is a string of letters and numbers used to indicate a type of an accelerator, for example, M11, M12, and M13 shown in FIG. 4. As shown in FIG. 4A, FIG. 4A is a schematic structural diagram of an accelerator image repository 230. The accelerator image repository 230 may include a first storage area and a second storage area. The first storage area is used to store image information. For example, FIG. 4A provides image information of images i1, i2, and i3. The second storage area is used to store an image. In an implementation, the second storage area may include a plurality of data blocks. The location of the image is a data block occupied by the image in the second storage area. For example, the images i1 to i3 are respectively stored in a block 1 to a block 3.

When the target accelerator is A12, the acceleration management controller 220 searches the accelerator image repository 230 based on the accelerator model M12 corresponding to the accelerator identifier A12, and determines that an image corresponding to the accelerator model M12 is i2, in other words, determines that an image that meets the acceleration requirement is i2. The acceleration management controller 220 obtains a descriptor of the image i2, where the descriptor may be at least one of an identifier and a location of the image i2.

As shown in FIG. 3, to correctly load the image to the accelerator, the method further includes S316 and S318.

In S316, the acceleration agent 310 receives the image, and sends the image to the accelerator driver 320 corresponding to the target accelerator.

In S318, the accelerator driver 320 loads the image, so that the target accelerator can implement the acceleration function.

Further, to more accurately manage the accelerator, as shown in FIG. 3, the method further includes the following steps.

In S320, the accelerator driver 320 sends a correspondence among the identifier of the target accelerator, the acceleration function of the to-be-created virtual machine, and the acceleration performance of the to-be-created virtual machine to the acceleration agent 310.

In S322, the acceleration agent 310 sends a notification message to the acceleration management controller 220, where the notification message includes the identifier of the target host, the identifier of the target accelerator, the acceleration function of the to-be-created virtual machine, and the acceleration performance of the to-be-created virtual machine.

The identifier of the target host may be an Internet Protocol (IP) address or a media access control (MAC) address of the host, or may be other information that can uniquely identify the target host.

In S324, after receiving the notification message, the acceleration management controller 220 sends an accelerator allocation message to the compute management function 210, where the accelerator allocation message includes the identifier of the target host.

The accelerator allocation message is used to notify the compute management function 210 that the image has been loaded for the accelerator on the target host.

In S326, after receiving the notification message, the acceleration management controller 220 may further update the acceleration database 240 based on the notification message.

Specifically, an acceleration function and acceleration performance that are corresponding to the target accelerator in the acceleration database 240 are updated to the acceleration function of the to-be-created virtual machine and the acceleration performance of the to-be-created virtual machine in the notification message, the state of the target accelerator is changed into "locked", and the acceleration function of the to-be-created virtual machine is set as the current function of the target accelerator. As shown in FIG. 5B, FIG. 5B shows an updated acceleration database 240. The accelerator A12 has loaded an image that can provide VXLAN forwarding corresponding to acceleration performance of 20 Gbps. Therefore, a state corresponding to a feature group {VXLAN forwarding, 20 Gbps} is changed into 1, a state corresponding to a feature group {VXLAN forwarding, 10 Gbps} is changed into 0, and it indicates that a current function of the accelerator A12 is the VXLAN forwarding in the feature group {virtual local area network (VLAN) forwarding, 20 Gbps}. In addition, because the image corresponding to the feature group {VLAN forwarding, 20 Gbps} is not allocated to a virtual machine for use, an accelerator state corresponding to the accelerator A12 is changed into "locked". Therefore, the accelerator A12 completes loading, and may be allocated to a virtual machine for use.

In addition, a developer may constantly develop a new image to update a function of an accelerator. Therefore, the accelerator loading apparatus 200 further receives a new image, stores the new image and image information of the new image in the accelerator image repository 230, and updates the acceleration database 240 based on the image information of the new image.

Figure 4B:
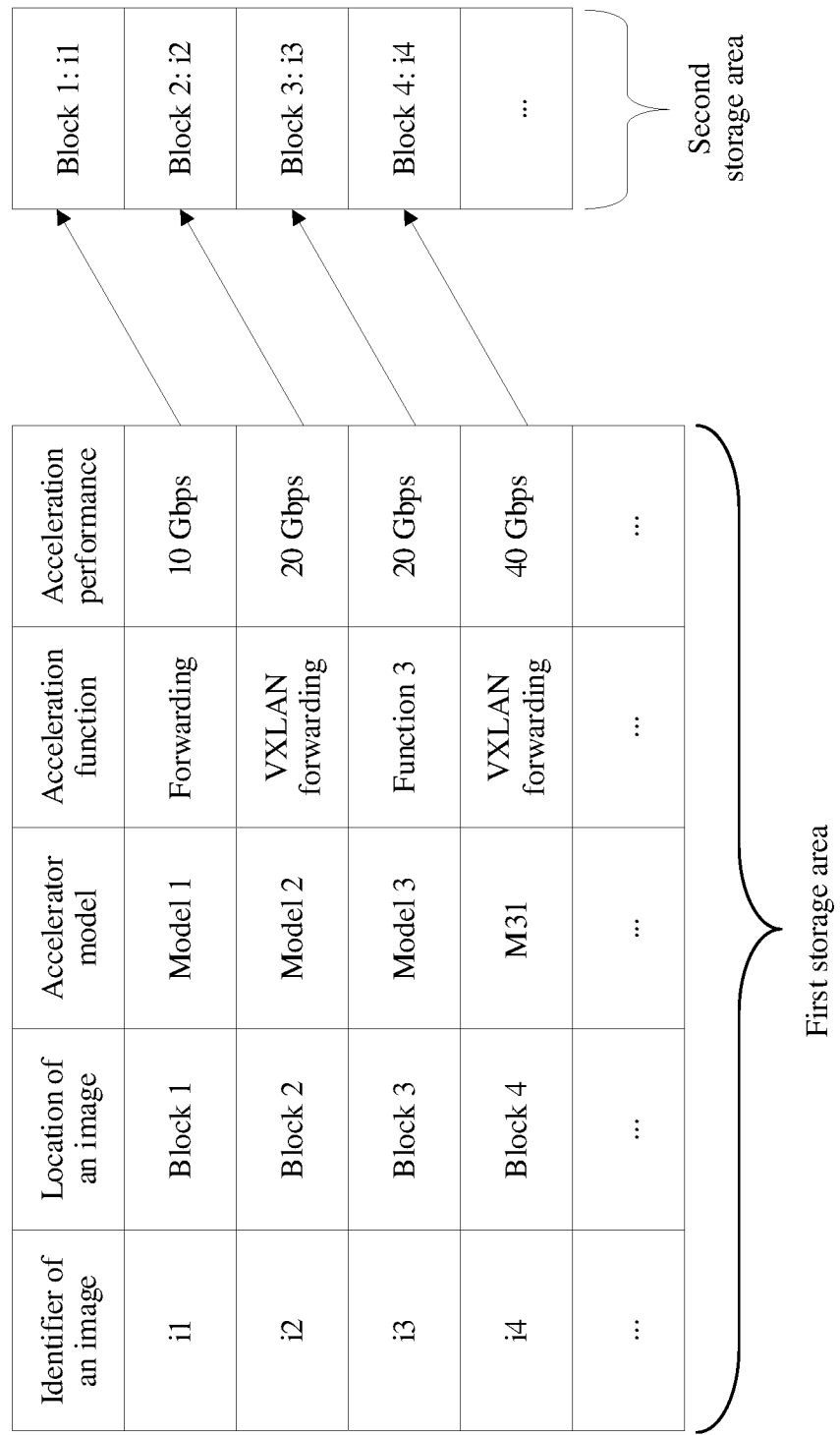
FIG. 4B is a schematic structural diagram of an updated accelerator image repository according to an embodiment of the disclosure.

For example, when the developer (an accelerator manufacturer) develops a new image i4 whose acceleration function is VXLAN forwarding and acceleration performance is 40 Gbps for an accelerator model M31, the developer sends the new image to the accelerator loading apparatus 200, and the accelerator loading apparatus 200 updates the accelerator image repository 230 based on the new image. An updated accelerator image repository 230 is shown in FIG. 4B. It can be seen that FIG. 4B further shows the image i4 and image information of i4 compared with FIG. 4A. Then, the acceleration management controller 220 traverses the acceleration database 240 based on the accelerator model M31 in the image information of i4, finds an accelerator A31 corresponding to the accelerator model M31 in the acceleration database 230, and adds one piece of feature group information for the accelerator A31. As shown in FIG. 5C, FIG. 5C shows an acceleration database 240 that is updated based on image information of a new image. An updated accelerator A31 has a feature group {VXLAN forwarding, 40 Gbps}. A descriptor of an image corresponding to the feature group {VXLAN forwarding, 40 Gbps} is D6, and D6 includes at least one of i4 and a block 4. A feature group mark corresponding to the feature group {VXLAN forwarding, 40 Gbps} is 0, and it indicates that the VXLAN forwarding in the feature group {VXLAN forwarding, 40 Gbps} is not a current function of the accelerator A31.

In the foregoing manner, the accelerator image repository 230 and the acceleration database 240 can be dynamically updated, to ensure that a most appropriate accelerator can be found during creation of a virtual machine, thereby implementing an acceleration function.

Numbers of the steps in FIG. 2 and FIG. 3 are merely used for ease of description, and do not constitute a limitation on an execution sequence of the steps.

Figure 6:
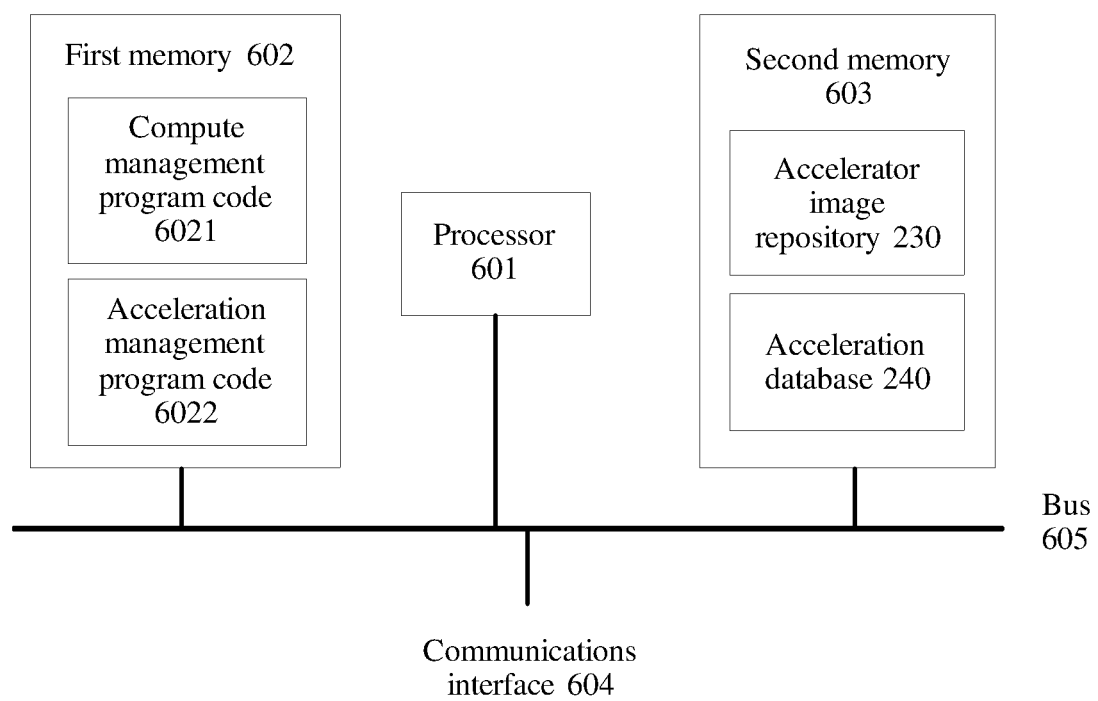
FIG. 6 is a schematic structural diagram of an accelerator loading apparatus according to an embodiment of the disclosure.

Based on the methods shown in FIG. 2 and FIG. 3, another embodiment of the disclosure provides an accelerator loading apparatus. As shown in FIG. 6, the accelerator loading apparatus includes a processor 601, a first memory 602, a second memory 603, and a communications interface 604. The processor 601, the first memory 602, the second memory 603, and the communications interface 604 communicate with each other by using a bus 605. The first memory 602 stores compute management program code 6021 and acceleration management program code 6022, and the second memory 603 stores an accelerator image repository 230 and an acceleration database 240.

The processor 601 is configured to: invoke the compute management program code 6021 to perform the steps performed by the compute management function 210 in FIG. 2 and FIG. 3, invoke the acceleration management program code 6022 to perform the steps performed by the acceleration management controller 220 in FIG. 2 and FIG. 3, and perform an operation such as searching, reading, or updating on the accelerator image repository 230 and the acceleration database 240 in a process of invoking the compute management program code 6021 or the acceleration management program code 6022.

The communications interface 604 is a set of interfaces configured to communicate with an external device, and includes at least an interface configured to obtain a request for creating a virtual machine, and an interface configured to communicate with a target host that is selected by the processor 601 by executing the compute management program code 6021.

The compute management program code 6021 and the acceleration management program code 6022 may be two separate computer programs, or may be two segments of one computer program.

In an implementation, the processor 601 in this embodiment of the disclosure may include two processors. One processor is configured to execute the compute management program code 6021, and the other processor is configured to execute the acceleration management program code 6022.

The first memory 602 and the second memory 603 may be two physically separate memories, or may be in a same physical storage device. Similarly, the accelerator image repository 230 and the acceleration database 240 may be in a same memory, or may be in different memories.

An embodiment of the disclosure further provides a computer storage medium, and the computer storage medium may store one or more programs. When the one or more programs are executed, some or all steps of the accelerator loading method described in the foregoing method embodiments can be implemented. In other words, when a computer device including one or more processors runs the one or more programs, the computer device performs the accelerator loading method described in the foregoing method embodiments.

In the disclosure, when a virtual machine needs to be created, the accelerator loading apparatus may determine, based on an acceleration function, acceleration performance, a computing resource requirement, and a storage resource requirement of the to-be-created virtual machine, a target host that can create the virtual machine, and load an image used for acceleration to an available accelerator of the target host, to implement dynamic accelerator loading and deployment.

The foregoing descriptions are merely example implementations of the disclosure. It should be noted that a person of ordinary skill in the art may make several improvements or polishing without departing from the principle of the disclosure and the improvements or polishing shall fall within the protection scope of the disclosure.

What is claimed is:

1. An accelerator loading method implemented by an accelerator loading apparatus, the accelerator loading method comprising:
    obtaining an acceleration requirement comprising an acceleration function of a to-be-created virtual machine and acceleration performance of the to-be-created virtual machine;
    searching an acceleration database based on the acceleration function and the acceleration performance to determine candidate hosts that can provide available accelerators that meet the acceleration function and the acceleration performance;
    determining acceleration information about the available accelerators, wherein the acceleration information comprises an identifier of a respective candidate host, an identifier of a respective available accelerator, an accelerator model of the respective available accelerator, a feature group of the respective available accelerator, an attribute of the respective available accelerator, and a status of the respective available accelerator, wherein the feature group comprises an available acceleration function of the respective available accelerator and an available acceleration performance of the respective available accelerator, and wherein the attribute indicates whether the respective available accelerator can load an image;
    selecting, based on the acceleration information, a first candidate host from the candidate hosts as a target host;
    selecting, based on the acceleration information, a first available accelerator of the target host as a target accelerator;
    determining an image corresponding to the target accelerator; and
    sending, to a target host comprising the target accelerator, an image loading command comprising a descriptor of the image and an identifier of the target accelerator,
    wherein the image loading command is configured to enable the target host to load the image in response to the image loading command, and
    wherein the descriptor comprises at least one of an identifier of the image or a location of the image.

2. The accelerator loading method of claim 1, further comprising:

obtaining a host list corresponding to the acceleration requirement, wherein the host list comprises identifiers of hosts that meet the acceleration requirement;

searching the acceleration database based on the host list, the acceleration function, and the acceleration performance; and determining a first candidate host from the host list that provides a first available accelerator that meets the acceleration function and the acceleration performance.

3. The accelerator loading method of claim 2, further comprising:

obtaining a request for creating the to-be-created virtual machine, wherein the request comprises a computing resource requirement of the to-be-created virtual machine, a storage resource requirement of the to-be-created virtual machine, and the acceleration requirement;

searching the accelerator loading apparatus for hosts that meet the computing resource requirement and the storage resource requirement; and generating the host list based on the identifiers of the hosts.

4. The accelerator loading method of claim 1, further comprising further selecting the first candidate host as the target host based on a host filtering rule.

5. The accelerator loading method of claim 1, wherein the acceleration database further comprises a descriptor of an image corresponding to a feature group of each accelerator, and wherein the accelerator loading method further comprises:

determining a target feature group of the target accelerator and a descriptor of an image corresponding to the target feature group; and using the image corresponding to the target feature group as the image of the target accelerator, wherein an acceleration function of the target feature group is the acceleration function of the to-be-created virtual machine, and wherein acceleration performance of the target feature group is the acceleration performance of the to-be-created virtual machine.

6. The accelerator loading method of claim 5, wherein the acceleration database further comprises a mark of each feature group, wherein the mark indicates whether an acceleration function of the feature group is a current function of an accelerator corresponding to the feature group, and wherein the accelerator loading method further comprises determining that the target accelerator meets a loading condition when the acceleration function of the target feature group is not a current function of the target accelerator and a state of the target accelerator is idle.

7. The method of claim 6, further comprising:

receiving from the target host an image request comprising the descriptor; and obtaining the image from an accelerator image repository based on the descriptor; and sending the image to the target host.

8. The accelerator loading method of claim 1, wherein the acceleration function is encryption, decryption, compression, decompression, layer 3 forwarding, or virtual extensible local area network (VXLAN) forwarding.

9. The accelerator loading method of claim 1, wherein the acceleration performance is a speed at which the acceleration function is implemented.

10. An accelerator loading apparatus comprising:

an acceleration database configured to store acceleration information of each host managed by the accelerator loading apparatus, wherein the acceleration information of each host comprises an identifier of the host, an identifier of each accelerator of the host, an accelerator model of the accelerator, a feature group of the accelerator, an attribute of the accelerator, and a status of the accelerator, wherein the feature group comprises an acceleration function of the accelerator and acceleration performance of the accelerator, wherein the attribute indicates whether the accelerator can load an image; and a processor coupled to the acceleration database and configured to:

obtain an acceleration requirement comprising an acceleration function of a to-be-created virtual machine and acceleration performance of the to-be-created virtual machine;

search an acceleration database based on the acceleration function and the acceleration performance to determine candidate hosts that can provide available accelerators that meet the acceleration function and the acceleration performance;

determine the acceleration information;

select based on the acceleration information a first candidate host from the candidate hosts as a target host;

select, based on the acceleration information a first available accelerator of the target host as a target accelerator; and send, to the target host, an image loading command comprising a descriptor of the image and an identifier of the target accelerator, wherein the image loading command enables the target host to load the image in response to the image loading command.

11. The accelerator loading apparatus of claim 10, wherein the processor is further configured to:

obtain a host list corresponding to the acceleration requirement, wherein the host list comprises identifiers of hosts that meet the acceleration requirement;

search the acceleration database based on the host list, the acceleration function, and the acceleration performance; and determine a first candidate host from the host list that provides a first available accelerator that meets the acceleration function and the acceleration performance.

12. The accelerator loading apparatus of claim 11, wherein the processor is further configured to:

obtain a request for creating the to-be-created virtual machine, wherein the request comprises a computing resource requirement of the to-be-created virtual machine, a storage resource requirement of the to-be-created virtual machine, and the acceleration requirement;

search the accelerator loading apparatus for hosts that meet the computing resource requirement and the storage resource requirement; and generate the host list based on the identifiers of the hosts.

13. The accelerator loading apparatus of claim 11, wherein the acceleration requirement further comprises a computing resource requirement of the to-be-created virtual machine and a storage resource requirement of the to-be-created virtual machine, and wherein the processor is further configured to:

search the accelerator loading apparatus for hosts that meet the computing resource requirement and the storage resource requirement, and generate the host list based on the identifiers of the hosts.

14. The accelerator loading apparatus of claim 13, wherein the acceleration database further comprises a descriptor of an image corresponding to a feature group of each accelerator, and wherein the processor is further configured to:
determine a target feature group of the target accelerator and a descriptor of an image corresponding to the target feature group; and
use the image corresponding to the target feature group as the image of the target accelerator,
wherein an acceleration function of the target feature group is the acceleration function of the to-be-created virtual machine, and
wherein acceleration performance of the target feature group is the acceleration performance of the to-be-created virtual machine.

15. The accelerator loading apparatus of claim 10, wherein the acceleration requirement further comprises a host filtering rule, and wherein the processor is further configured to further select the first candidate host as the target host based on the host filtering rule.

16. The accelerator loading apparatus of claim 10, wherein the processor is further configured to:
obtain a candidate host notification message, wherein the candidate host notification message comprises information about each candidate host of the candidate hosts, wherein the information about each candidate host comprises at least an identifier of the candidate host;
select the first candidate host as the target host based on a host filtering rule;
send an identifier of the target host; and
determine the target host based on the identifier of the target host.

17. The accelerator loading apparatus of claim 10, wherein the acceleration function is encryption, decryption, compression, decompression, layer 3 forwarding, or virtual extensible local area network (VXLAN) forwarding.

18. The accelerator loading apparatus of claim 10, wherein the acceleration performance is a speed at which the acceleration function is implemented.

19. An accelerator loading system comprising:
a plurality of hosts comprising a target host, wherein the target host comprises a target accelerator; and
an accelerator loading apparatus comprising:
a communications interface; and
a processor coupled to the communications interface and configured to:
obtain an acceleration requirement comprising an acceleration function of a to-be-created virtual machine and acceleration performance of the to-be-created virtual machine;
search an acceleration database based on the acceleration function and the acceleration performance to determine candidate hosts that can provide available accelerators that meet the acceleration function and the acceleration performance;
determine acceleration information about the available accelerators, wherein the acceleration information about the available accelerators comprises an identifier of the host, an identifier of each accelerator of the host, an accelerator model of the accelerator, a feature group of the accelerator, an attribute of the accelerator, and a status of the accelerator, wherein the feature group comprises an acceleration function of the accelerator and acceleration performance of the accelerator, wherein the attribute indicates whether the accelerator can load an image;
select, based on the acceleration information, a first candidate host from the candidate hosts as the target host;
select, based on the acceleration information, a first available accelerator of the target host as the target accelerator;
determine an image corresponding to the target accelerator; and
send, to the target host, an image loading command comprising a descriptor of the image and an identifier of the target accelerator, wherein the descriptor comprises at least one of an identifier of the image or a location of the image,
wherein the target host is configured to:
receive the image loading command from the accelerator loading apparatus; and
load the image in response to the image loading command.

20. The accelerator loading system of claim 19, wherein the processor is further configured to:
obtain a host list corresponding to the acceleration requirement, wherein the host list comprises identifiers of hosts that meet the acceleration requirement;
search the acceleration database based on the host list, the acceleration function, and the acceleration performance; and
determine a first candidate host from the host list that provides a first available accelerator that meets the acceleration function and the acceleration performance.

21. The accelerator loading system of claim 20, wherein the processor is further configured to:
obtain a request for creating the to-be-created virtual machine, wherein the request comprises a computing resource requirement of the to-be-created virtual machine, a storage resource requirement of the to-be-created virtual machine, and the acceleration requirement;
search the accelerator loading apparatus for hosts that meet the computing resource requirement and the storage resource requirement; and
generate the host list based on the identifiers of the hosts.

22. The accelerator loading system of claim 19, wherein the acceleration function is encryption, decryption, compression, decompression, layer 3 forwarding, or virtual extensible local area network (VXLAN) forwarding.

23. The accelerator loading system of claim 19, wherein the acceleration performance is a speed at which the acceleration function is implemented.

24. The accelerator loading system of claim 19, wherein the processor is further configured to further select the first candidate host as the target host based on a host filtering rule.

25. The accelerator loading system of claim 19, wherein the acceleration database further comprises a descriptor of an image corresponding to a feature group of each accelerator, and wherein the processor is further configured to:
determine a target feature group of the target accelerator and a descriptor of an image corresponding to the target feature group; and
use the image corresponding to the target feature group as the image of the target accelerator,
wherein an acceleration function of the target feature group is the acceleration function of the to-be-created virtual machine, and wherein acceleration performance of the target feature group is the acceleration performance of the to-be-created virtual machine.

26. The accelerator loading system of claim 25, wherein the acceleration database further comprises a mark of each feature group, wherein the mark indicates whether an acceleration function of the feature group is a current function of an accelerator corresponding to the feature group, and wherein the processor is further configured to determine that the target accelerator meets a loading condition when the acceleration function of the target feature group is not a current function of the target accelerator and a state of the target accelerator is idle.

* * * * *

UNITED STATES PATENT AND TRADEMARK OFFICE
CERTIFICATE OF CORRECTION

PATENT NO. : 11,416,267 B2
APPLICATION NO. : 16/407920
DATED : August 16, 2022
INVENTOR(S) : Qian Cao, Yuping Zhao and Xinyu Hu It is certified that error appears in the above-identified patent and that said Letters Patent is hereby corrected as shown below:

In the Claims

Claim 10, Column 20, Line 23: "select based on the acceleration information a first" should read "select, based on the acceleration information, a first"

Claim 10, Column 20, Line 26: "on the acceleration information a first" should read "on the acceleration information, a first"

Signed and Sealed this
Eleventh Day of October, 2022

Katherine Kelly Vidal
*Director of the United States Patent and Trademark Office*